(12) United States Patent
Iizuka et al.

(10) Patent No.: US 9,006,335 B2
(45) Date of Patent: Apr. 14, 2015

(54) RUBBER COMPOSITION FOR TIRE TREAD AND PNEUMATIC TIRE

(75) Inventors: Munenori Iizuka, Kodaira (JP); Masashi Otsuki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 109 days.

(21) Appl. No.: 13/501,852

(22) PCT Filed: Oct. 15, 2010

(86) PCT No.: PCT/JP2010/006150
§ 371 (c)(1),
(2), (4) Date: Apr. 13, 2012

(87) PCT Pub. No.: WO2011/045944
PCT Pub. Date: Apr. 21, 2011

(65) Prior Publication Data
US 2012/0202929 A1 Aug. 9, 2012

(30) Foreign Application Priority Data
Oct. 15, 2009 (JP) ................................ 2009-238414

(51) Int. Cl.
C08L 25/10 (2006.01)
C08K 5/19 (2006.01)
C08K 5/3432 (2006.01)
C08K 3/36 (2006.01)
B60C 1/00 (2006.01)
C08K 5/3445 (2006.01)

(52) U.S. Cl.
CPC ............. *B60C 1/0016* (2013.01); *C08K 5/3432* (2013.01); *C08K 5/19* (2013.01); *C08L 2666/86* (2013.01); *C08K 3/36* (2013.01); *C08K 5/3445* (2013.01)

(58) Field of Classification Search
USPC ............................... 524/99, 86, 186, 575, 789
See application file for complete search history.

(56) References Cited

U.S. PATENT DOCUMENTS 6,476,115 B1 11/2002 Wideman et al.
2007/0293610 A1* 12/2007 Halasa et al. .................. 524/127
2010/0004359 A1 1/2010 Wang et al.

FOREIGN PATENT DOCUMENTS

| JP | 10-058914 A | 3/1998 |
| JP | 10-081783 A | 3/1998 |
| JP | 2004-131571 A | 4/2004 |
| JP | 2004-131572 A | 4/2004 |
| JP | 2008-163109 A | 7/2008 |

OTHER PUBLICATIONS

Chinese Office Action for Application No. 201080057264.0 dated Apr. 9, 2013.
Extended European Search Report for Application No. 10823212.5 dated May 2, 2013.
Cho et al.; A solid state actuator based on polypyrrole (PPy) and a solid electrolyte NBR working in air; Proc. of SPIE, vol. 5759, Mar. 6, 2005 (Mar. 26, 2005), pp. 534-539.
Database WPI Week 200866, Thomson Scientific, London, GB; AN 2008-L25759, for JP-A-2008-163109 dated Jul. 17, 2008.
International Search Report issued on Jan. 11, 2011 in PCT/JP2010/006150.
Chinese Office Action in corresponding Chinese Application No. 201080057264.0 issued Sep. 3, 2013.
Office Action dated Aug. 19, 2014, from the Japanese Patent Office in Japanese Application No. 2011-536049.

* cited by examiner

*Primary Examiner* — Satya Sastri
(74) *Attorney, Agent, or Firm* — Sughrue Mion, PLLC

(57) ABSTRACT

The present invention relates to a pneumonic tire and a rubber composition used in the same, both of which are capable of preventing static charge build-up on a tire surface without degrading various tire performances such as rolling resistance and so on, and particularly to a rubber composition comprising 10 to 30 parts by mass of an ionic liquid and 5 to 95 parts by mass of silica per 100 parts by mass of a rubber component containing at least 50% by mass of styrene-butadiene rubber, as well as a pneumatic tire using such a rubber composition in a tread portion.

5 Claims, No Drawings

RUBBER COMPOSITION FOR TIRE TREAD AND PNEUMATIC TIRE

CROSS REFERENCE TO RELATED APPLICATIONS

This application is a National Stage of International Application No. PCT/JP2010/006150 filed Oct. 15, 2010, claiming priority based on Japanese Patent Application No. 2009-238414 filed Oct. 15, 2009, the contents of all of which are incorporated herein by reference in their entirety.

TECHNICAL FIELD

The present invention relates to a rubber composition for a tire tread and a pneumatic tire, and more particularly to a rubber composition capable of reducing static charge build-up on a tire surface without damaging dynamic characteristics of a pneumatic tire, thereby preventing discharge and contamination due to accumulation of dust or the like when applied to a tread portion of the pneumatic tire, as well as a pneumatic tire using such a rubber composition.

BACKGROUND ART

In recent years, many attempts have been made to improve fuel-efficiency of vehicles due to emission controls for passenger cars and concerns about the environment etc. One efficient method for improving the fuel-efficiency of a vehicle is to reduce rolling resistance of the tires.

Principal causes of the rolling resistance of a tire include energy loss attributed to inner frictions that occur in various constituents of the tire, such as the tread portion, a sidewall, a carcass, and an inner liner. Accordingly, reducing the energy loss in the tire most effectively helps reduce the rolling resistance of the tire.

The rolling resistance of the tire in particular correlates significantly with loss tangent (tan δ), as measured in the rubber composition constituting the tire tread portion and at 60° C., and lowering the value tan δ results in improved fuel-efficiency of a vehicle.

As one of conventional techniques to lower tan δ at 60° C., it has been suggested to use, in a reinforcing agent to be added to a rubber component, 0 to 100% by mass of silica based on a total amount of the reinforcing agent. However, when silica is added as the reinforcing agent, static charge tends to occur on a rubber surface, which breeds other problems such as occurrence of discharge, interfered radiofrequency reception, and contamination due to accumulation of fine dust or the like.

In an attempt to prevent the static charge build-up on the rubber surface, for example, Patent Document 1 discloses a pneumatic tire coated with anti-static cement. Patent Document 2 also discloses a pneumatic tire in which a highly conductive sheet is interposed in at least one point on a tread circumference.

However, the pneumatic tire of Patent Document 1 needs further review at least in terms of ecological influence. There is also room for improvement in durability of the pneumatic tire of Patent Document 2.

PRIOR ART DOCUMENTS

Patent Documents

Patent Document 1: JP-A-H10-81783
Patent Document 2: JP-A-H10-58914

SUMMARY OF THE INVENTION

Problems to be Solved by the Invention

The present invention has been conceived in light of the above problems, and it is an objective thereof to provide a pneumatic tire that is capable of suppressing the static charge build-up on a tire surface without degrading tire performances such as rolling resistance and so on. Furthermore, it is another objective of the present invention to provide a rubber composition that solves the above problems.

Means for Solving the Problem

The present inventors have conducted earnest studies in order to find a way to provide a pneumonic tire that solves the above problems and discovered that the targeted rubber composition can be obtained by compounding a certain amount of ionic liquid and silica and that applying the rubber composition to a tire tread portion prevents the static charge build-up on the tire surface without degrading the tire performances such as rolling resistance and so on, and as a result, have accomplished the present invention.

Specifically, the present invention has the following main features in order to solve the above problems.

(1) A rubber composition comprising 10 to 30 parts by mass of an ionic liquid and 5 to 95 parts by mass of silica per 100 parts by mass of a rubber component containing at least 50% by mass of styrene-butadiene rubber.

(2) The rubber composition according to the item (1), which comprises 5 to 20 parts by mass of a silane coupling agent per 100 parts by mass of the silica.

(3) The rubber composition according to the item (1) or (2), wherein an amount of the silica to be added is 70 to 90 parts by mass per 100 parts by mass of the rubber component.

(4) The rubber composition according to any one of the items (1) to (3), which comprises 0 to 50 parts by mass of carbon black per 100 parts by mass of the rubber component.

(5) The rubber composition according to the item (4), wherein a total amount of the carbon black and the silica is 30 to 90 parts by mass per 100 parts by mass of the rubber component.

(6) The rubber composition according to any one of the items (1) to (5), which has a 50% potential decay time of 100 seconds or less after a voltage of 1000 V is applied for 60 seconds. Here, the 50% potential decay time denotes a period of time necessary for the voltage to decay to 500 V, half the initial voltage 1000 V, after the voltage application.

(7) The rubber composition according to any one of the items (1) to (6), wherein the ionic liquid is at least one of ionic liquids represented by the following formulae (I) to (IV):

[Chem. 1]

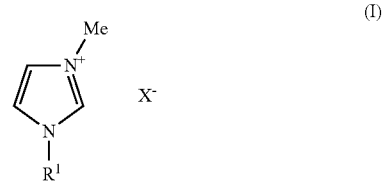

-continued

[Chem. 2]

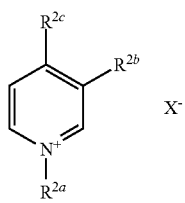
(II)

[Chem. 3]

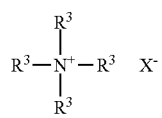
(III)

[Chem. 4]

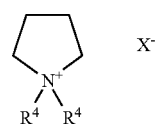
(IV)

wherein $R^1$, $R^{2a}$, $R^3$, and $R^4$ are independently an alkyl group having 1 to 8 carbon atoms, $R^{2b}$ and $R^{2c}$ are independently hydrogen or an alkyl group having 1 to 8 carbon atoms, and X is independently $CH_3SO_4$, Br, Cl, $NO_3$, $PF_6$, $BF_4$, tosyl, $CF_3SO_3$, $(CF_3SO_2)_2N$, $(C_2F_5SO_2)_2N$, $CH_3O(C_2H_4O)_2SO_3$, $CH_3OSO_3$, or $C_8H_{17}SO_3$.

(8) A pneumatic tire using a rubber composition as described in any one of the items (1) to (7) in a tread portion thereof.

Effects of the Invention

According to the present invention, a rubber composition for a tire tread can be provided that is anti-static and also capable of improving fuel-efficiency performance of a tire by reducing rolling resistance (RR), and a pneumatic tire using such a rubber composition can be also provided.

Consequently, the present invention solves various conventional problems attributed to the static charge build-up on a tire surface, such as occurrence of discharge, interfered radio frequency reception, and contamination due to accumulation of fine dust or the like.

BEST MODES FOR CARRYING OUT THE INVENTION

The present invention is described in detail below. The rubber composition according to the present invention is characterized by comprising 10 to 30 parts by mass of an ionic liquid and 5 to 95 parts by mass of silica per 100 parts by mass of a rubber component containing at least 50% by mass of styrene-butadiene rubber.

The rubber component used in the rubber composition according to the present invention may include, but not limited to, chloroprene rubber (CR), acrylonitrile-butadiene rubber (NBR), butadiene rubber (BR), isoprene rubber (IR), natural rubber (NR) and so on, as well as the styrene-butadiene rubber (SBR). These other rubber components may be used alone or in a blend of two or more.

Note that the rubber component used in the rubber composition according to the present invention includes at least 50% by mass of styrene-butadiene rubber (SBR) because at least 50% by mass of styrene-butadiene rubber (SBR) offers a guarantee for providing the rubber composition with excellent properties in terms of elasticity, wear resistance, mechanical strength, and aging resistance.

The silica used in the rubber composition according to the present invention is not particularly limited, and may include silica having a nitrogen absorption surface area ($N_2SA$) of 100 to 300 $m^2/g$, preferably 150 to 250 $m^2/g$.

As for silica, synthetic silica prepared through a precipitation method is preferably used. Some of the specific examples include "Nipsil VN3 AQ" manufactured by Nippon Silica Kogyo Co., Ltd., "ULTRASIL VN3" and "BV3370GR" manufactured by Degussa Company in Germany, "RP1165MP", "Zeosil 65GR", and "Zeosil 175VP" manufactured by Rhone Poulenc Co., "Hisil 233", "Hisil 210", and "Hisil 250" manufactured by PPG Co. (wherein each of the phrases placed in quotation marks is a product name).

The amount of the silica to be added is from 5 to 95 parts by mass per 100 parts by mass of the aforementioned rubber component. When the added amount of the silica is less than 5 parts by mass per 100 parts by mass of the rubber component, the tire suffers a larger hysteresis loss and a larger rolling resistance. While when the added amount of the silica is more than 95 parts by mass per 100 parts by mass of the rubber component, the wear resistance is deteriorated, and the processability is deteriorated since the rubber composition becomes stiff.

The purpose of the use of the ionic liquid in the rubber composition according to the present invention is to achieve desired anti-static characteristics. The ionic liquid is not particularly limited, and may include pyridinium-based compounds, imidazolium-based compounds, ammonium-based compounds, pyrrolidinium-based compounds, sulfonium-based compounds, phosphonium-based compounds, guanidium-based compounds and so on. When the amount of the ionic liquid to be added is less than 10 parts by mass, the anti-static effect cannot be achieved, and processability during the rubber kneading is deteriorated. While when the added amount of ionic liquid is more than 30 parts by mass, there is a problem that the rubber loses rigidity and steering stability of the tire is deteriorated, or a part of the ionic liquid precipitates onto the rubber surface due to bleed-out.

Further, in the present invention, it is preferable to use a silane coupling agent which is capable of strengthening a binding force between the silica and the rubber component, thereby further improving the wear resistance. The amount of the silane coupling agent to be added is preferably 5 to 20 parts by mass, more preferably 7.5 to 12.5 parts by mass per 100 parts by mass of the silica.

The silane coupling agent which can be used in the present invention is not particularly limited and may include, for example, bis(3-triethoxysilylpropyl) polysulfide, bis(3-triethoxysilylpropyl) tetrasulfide, γ-mercaptopropyl trimethoxysilane, γ-mercaptopropyl triethoxysilane, γ-aminopropyl trimethoxysilane, γ-aminopropyl triethoxysilane, vinyltrimethoxysilane, vinyltriethoxysilane, γ-glycidoxypropyl trimethoxysilane, γ-glycidoxypropylmethyl diethoxysilane, 3-trimethoxysilylpropyl-N,N-dimethylcarbamoyl tetrasulfide, 3-trimethoxysilylpropyl benzothiazolyl tetrasulfide, 3-trimethoxysilylpropylmethacrylate monosulfide and so on.

When the amount of the silane coupling agent to be added is less than 5 parts by mass, the benefit of the added silane coupling agent is small, while when the added amount of the silane coupling agent is more than 20 parts by mass, there might be unwanted effects of incurring increased cost although the benefit of the added silane coupling agent remains almost unchanged.

In the rubber composition according to the present invention, the amount of the silica to be added is more preferably 70 to 90 parts by mass per 100 parts by mass of the rubber component. When the amount of the silica added is within the above range, the rolling resistance, wear resistance, and processability of the tire are secured in a better balanced manner.

In the present invention, preferably 0 to 50 parts by mass of carbon black, more preferably 5 to 50 parts by mass of carbon black is compounded per 100 parts by mass of the rubber component. By adding 5 parts by mass or more of the carbon black per 100 parts by mass of the rubber component, reinforcement and durability of the tire is sufficiently assured. Further, when the amount of the carbon black added is 50 parts by mass or less per 100 parts by mass of the rubber component, it is possible to prevent an increase in the rolling resistance of the tire due to an increase in hysteresis loss of the rubber and to avoid a deterioration of the processability.

Note that the carbon black used in the rubber composition according to the present invention is not particularly limited, and specifically includes carbon black of a quality conforming to ASTM N339, N234, N110 and the like.

Further, in the present invention, a total amount of the carbon black and the silica is preferably 30 to 90 parts by mass, more preferably 45 to 80 parts by mass per 100 parts by mass of the rubber component. When the total amount of the carbon black and the silica is 30 parts by mass or more, excellent WET braking performance and turning performance can be attained. Moreover, it is preferable that the total amount is 90 parts by mass or less, because with this total amount, the rubber composition is prevented from becoming too stiff or too soft.

Furthermore, the rubber composition according to the present invention preferably has a 50% potential decay time of 100 seconds or less, more preferably 70 seconds or less, after a voltage of 1000 V is applied for 60 seconds. Here, the 50% potential decay time denotes a period of time necessary for the voltage to decay to 500 V, half the initial voltage 1000 V, after the voltage application, and can be omitted below simply as the 50% potential decay time.

When the 50% potential decay time of the rubber composition according to the present invention is 100 seconds or less, more preferably 70 seconds or less, the static charge build-up on the tire surface is sufficiently reduced. In this regard, a method for measuring the 50% potential decay time is not particularly limited, and for example, a scorotron charge evaluation apparatus or the like may be used for evaluation.

Furthermore, the ionic liquid in the rubber composition according to the present invention is preferably at least one of the ionic liquids represented by the formulae (I) to (IV).

The ionic liquids represented by the formulae (I) to (IV) refer to, in the stated order, an imidazolium-based ionic liquid, a pyridinium-based ionic liquid, an ammonium-based ionic liquid, and a pyrrolidinium-based ionic liquid.

In the formulae (I) to (IV), $R^1$, $R^{2a}$, $R^3$, and $R^4$ are independently an alkyl group having 1 to 8 carbon atoms, $R^{2b}$ and $R^{2c}$ are independently hydrogen or an alkyl group having 1 to 8 carbon atoms, and X is independently $CH_3SO_4$, Br, Cl, $NO_3$, $PF_6$, $BF_4$, tosyl, $CF_3SO_3$, $(CF_3SO_2)_2N$, $(C_2F_5SO_2)_2N$, $CH_3O(C_2H_4O)_2SO_3$, $CH_3OSO_3$ or $C_8H_{17}SO_3$.

The alkyl group having 1 to 8 carbon atoms includes methyl group, ethyl group, propyl group, butyl group, hexyl group, octyl group and so on.

<<Imidazolium-Based Ionic Liquid>>

Here, among the ionic liquids represented by the formula (I), particularly preferred is an ionic liquid having, as the combination {$R^1$/X}, one of {methyl/$CH_3SO_4$}, {ethyl/Br, Cl, $NO_3$, $PF_6$, $BF_4$, tosyl, $CF_3SO_3$, $(CF_3SO_2)_2N$, $(C_2F_5SO_2)_2N$}, {butyl/Br, Cl, $PF_6$, $BF_4$, $(CF_3SO_2)_2N$, $CH_3O(C_2H_4O)_2SO_3$, $CH_3OSO_3$, $C_8H_{17}SO_3$}, {hexyl/Cl, $PF_6$, $BF_4$}, and {octyl/Cl, $BF_4$}.

<<Pyridinium-Based Ionic Liquid>>

Similarly, among the ionic liquids represented by the formula (II), particularly preferred is an ionic liquid having, as the combination {$R^{2a}$/$R^{2b}$/$R^{2c}$/X}, one of {propyl, butyl/methyl/H/$(CF_3SO_2)_2N$} and {butyl/H/methyl/Br, Cl, $PF_6$, $BF_4$}.

<<Ammonium-Based Ionic Liquid>>

Moreover, among the ionic liquids represented by the formula (III), particularly preferred is an ionic liquid in which three of $R^3$s are methyl group ($CH_3$), one of $R^3$s is propyl group ($C_3H_8$), and X is $(CH_3SO_2)_2N$.

In the rubber composition according to the present invention, when the ionic liquid is at least one of the ionic liquids represented by the formulae (I) to (IV), the effect of preventing the static charge build-up on the tire surface is more efficiently achieved. Furthermore, among the ionic liquids represented by the formulae (I) to (IV), the aforementioned ionic liquids in which $R^1$ to $R^4$ and X are appropriately combined are even better in preventing the static charge build-up on the tire surface.

Thus, the rubber composition according to the prevention has been described. The present invention further provides a pneumatic tire using the above-described rubber composition in a tread portion thereof.

As described above, the pneumatic tire in which the rubber composition of the present invention is used in the tread portion exhibits excellent performances such as the rolling resistance, WET braking performance, turning performance, wear resistance and so on, and is capable of efficiently preventing the static charge build-up on the tire surface.

EXAMPLES

The following describes the present invention in further detail with reference to examples. However, the present invention is by no means limited to the examples.

Examples 1 to 3 and Comparative Example 1

The rubber compositions having formulations shown in Table 1 are obtained by kneading components with use of a Banbury mixer. With respect to each of the obtained rubber compositions, the 50% potential decay time, tan δ at 60° C. or 0° C., dynamic modulus of elasticity G' at 60° C. or 0° C., tensile stress M300 at 300% elongation and 25° C., elongation at break EB, and tensile strength at break TB are evaluated according to the measurement methods described below. Note that, among the rubber compositions, Comparative Example 1 is the rubber composition that does not satisfy the formulation according to the present invention, and Examples 1 to 3 are those satisfying the formulation according to the present invention.

(Measurement of tan δ at 60° C. or 0° C., and Dynamic Modulus of Elasticity G' at 60° C. or 0° C.)

Evaluation is conducted according to JIS K6301. In the evaluation, a sample (having a thickness of 6 mm and a diameter of 8 mm) is measured at a dynamic strain of 1% and a frequency of 15 Hz by means of a spectrometer. Note that the smaller the value of tan δ at 60° C. is, the smaller the loss tangent is and the better the rolling resistance is. Furthermore, the smaller the value of tan δ at 0° C. is, the better the WET braking performance is. Moreover, the larger the dynamic moduli of elasticity G' at 60° C. and 0° C. are, the better the steering stability is.

(Measurement of Tensile Stress M300 at 300% Elongation and 25° C., Elongation at Break EB, and Tensile Strength at Break TB)

Evaluation is conducted in accordance with JIS K6301. Note that as the tensile stress M300 at 300% elongation is larger, the rubber material is higher in modulus and is less transformative, and therefore the steering stability is better. Furthermore, the larger the elongation at break EB and tensile strength at break TB are, the better the dynamic characteristics are.

(Measurement of 50% Potential Decay Time)

A voltage of 1000 V-60 sec is applied to a sample (having a thickness of 2 mm and a diameter of 30 mm), and the decay characteristics are evaluated by means of the scorotron charge evaluation apparatus to measure the period of time (50% potential decay time) which is necessary for the voltage to decay to 500 V, half the initial voltage. Note that a smaller value is better because, as the value is smaller, the 50% potential decay time is shorter, and the static charge is less likely to occur.

TABLE 1

|  |  |  | Comparative Example 1 | Example 1 | Example 2 | Example 3 |
|---|---|---|---|---|---|---|
| Composition of Rubber | Rubber component ** | Parts by mass | 100 | 100 | 100 | 100 |
|  | Silica *1 |  | 80 | 80 | 80 | 80 |
|  | Silane coupling agent *2 |  | 10 | 10 | 10 | 10 |
|  | Zinc white |  | 2 | 2 | 2 | 2 |
|  | Vulcanization accelerator *3 |  | 2 | 2 | 2 | 2 |
|  | Vulcanization accelerator *4 |  | 1 | 1 | 1 | 1 |
|  | Sulfur |  | 1.5 | 1.5 | 1.5 | 1.5 |
|  | Oil |  | 20 | — | — | — |
|  | Ionic liquid A *5 |  | — | 20 | — | — |
|  | Ionic liquid A *6 |  | — | — | 20 | — |
|  | Ionic liquid A *7 |  | — | — | — | 20 |
| Property of Rubber | tan δ (60° C.) |  | — | 0.114 | 0.117 | 0.112 | 0.106 |
|  | tan δ (0° C.) |  | — | 0.20 | 0.18 | 0.17 | 0.17 |
|  | G' (60° C.) | MPa | 5.1 | 5.3 | 5.5 | 5.7 |
|  | G' (0° C.) | MPa | 8.7 | 10.7 | 10.9 | 11.0 |
|  | M300 (25° C.) | MPa | 13.2 | 18.6 | 16.7 | 17.5 |
|  | EB (25° C.) | % | 320 | 246 | 268 | 277 |
|  | TB (25° C.) | MPa | 17.5 | 22.0 | 19.5 | 21.8 |
| 50% Potential decay time |  | sec | 81.9 | 50.5 | 35.2 | 25.5 |

**; Styrene-butadiene rubber manufactured by JSR, Co., Ltd., #1500
*1; AQ manufactured by Japan Silica Industrial Co., Ltd.
*2; Si69 manufactured by Degussa Co., Ltd.
*3; NOCCELER DM manufactured by Ouchi Shinko Chemical Industrial Co., Ltd.
*4; NOCCELER NS manufactured by Ouchi Shinko Chemical Industrial Co., Ltd.
*5; N-butyl-N-methylpyrrolidinium bis(trifluoromethanesulfonyl)imide
*6; N,N,N-trimethyl-N-propylammonium bis(trifluoromethanesulfonyl)imide
*7; 1-ethyl-3-methylpyridinium bis(trifluoromethylsulfonyl)imide As can be seen from the results shown in Table 1, compared with Comparative Example 1, Examples 1 to 3 show a tendency to be small in tan δ both at 60° C. and 0° C. and superior in terms of the rolling resistance and the WET braking performance. Furthermore, Examples 1 to 3 are larger than Comparative Example 1 in the dynamic moduli of elasticity G' both at 60° C. and 0° C. and in the tensile stress M300 at 300% elongation and 25° C., which shows that Examples 1 to 3 have excellent steering stability. Moreover, the elongation at break EB, and the tensile strength at break TB at a temperature of 25° C. are sufficiently large in Examples 1 to 3, which shows that Examples 1 to 3 have sufficient dynamic characteristics.

Furthermore, the 50% potential decay time of each of Examples 1 to 3 is shorter than that of Comparative Example 1, which shows that the static charge is less likely to occur in Examples 1 to 3. This effect is obtained by adding appropriate parts by mass of the ionic liquid into the rubber composition.

From the above results, it can be understood that the rubber composition according to the present invention has excellent properties in terms of loss tangent, dynamic modulus of elasticity, tensile stress, and others, and is less likely to suffer the static charge build-up. Accordingly, it is found out that applying the rubber composition to the tread portion of the pneumatic tire prevents the static charge build-up on the tire surface without degrading various tire performance such as the rolling resistance and so on.

The invention claimed is:

1. A rubber composition comprising 10 to 30 parts by mass of an ionic liquid and 70 to 90 parts by mass of silica per 100 parts by mass of styrene-butadiene rubber,
   wherein the ionic liquid is at least one of ionic liquids represented by the following formulae (II) to (III):

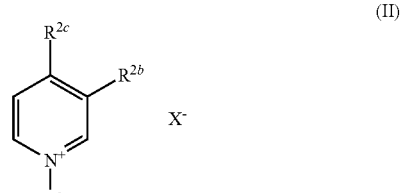

(II)

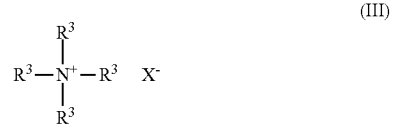

(III)

wherein $R^{R2a}$ and $R^3$ are independently an alkyl group having 1 to 8 carbon atoms, $R^{2b}$ and $R^{2c}$ are independently hydrogen or an alkyl group having 1 to 8 carbon atoms, and X is $(CF_3SO_2)_2N$.

2. The rubber composition according to claim 1, comprising 5 to 20 parts by mass of a silane coupling agent per 100 parts by mass of the silica.

3. The rubber composition according to claim 1, comprising 0 to 50 parts by mass of carbon black per 100 parts by mass of the styrene-butadiene rubber 4. The rubber composition according to claim 1, which has a 50% potential decay time of 100 seconds or less after a voltage of 1000 V is applied for 60 seconds.

5. A pneumatic tire using a rubber composition as claimed in claim 1 in a tread portion thereof.

* * * * *